July 20, 1937.  J. W. WHITE  2,087,392
BRAKE MECHANISM
Filed March 27, 1933  3 Sheets-Sheet 2
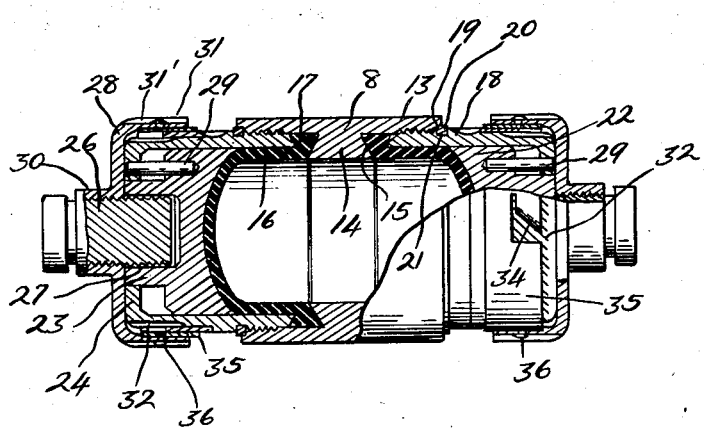
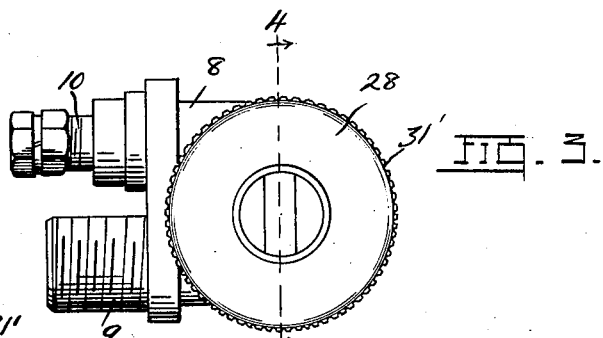
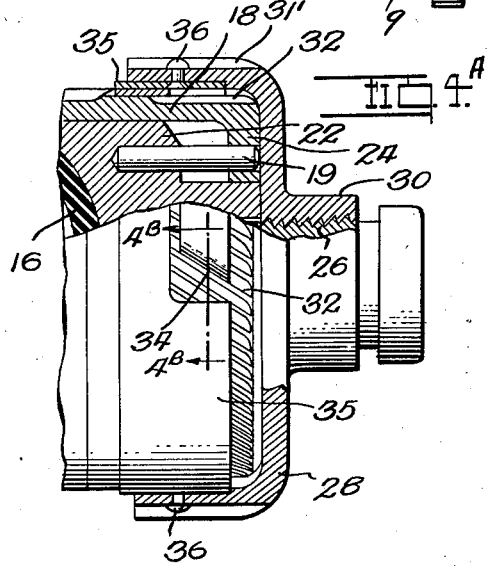
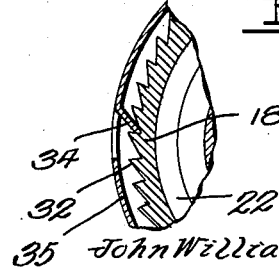
Inventor
John William White
By Whittemore Hulbert Whittemore Belknap
Attorneys

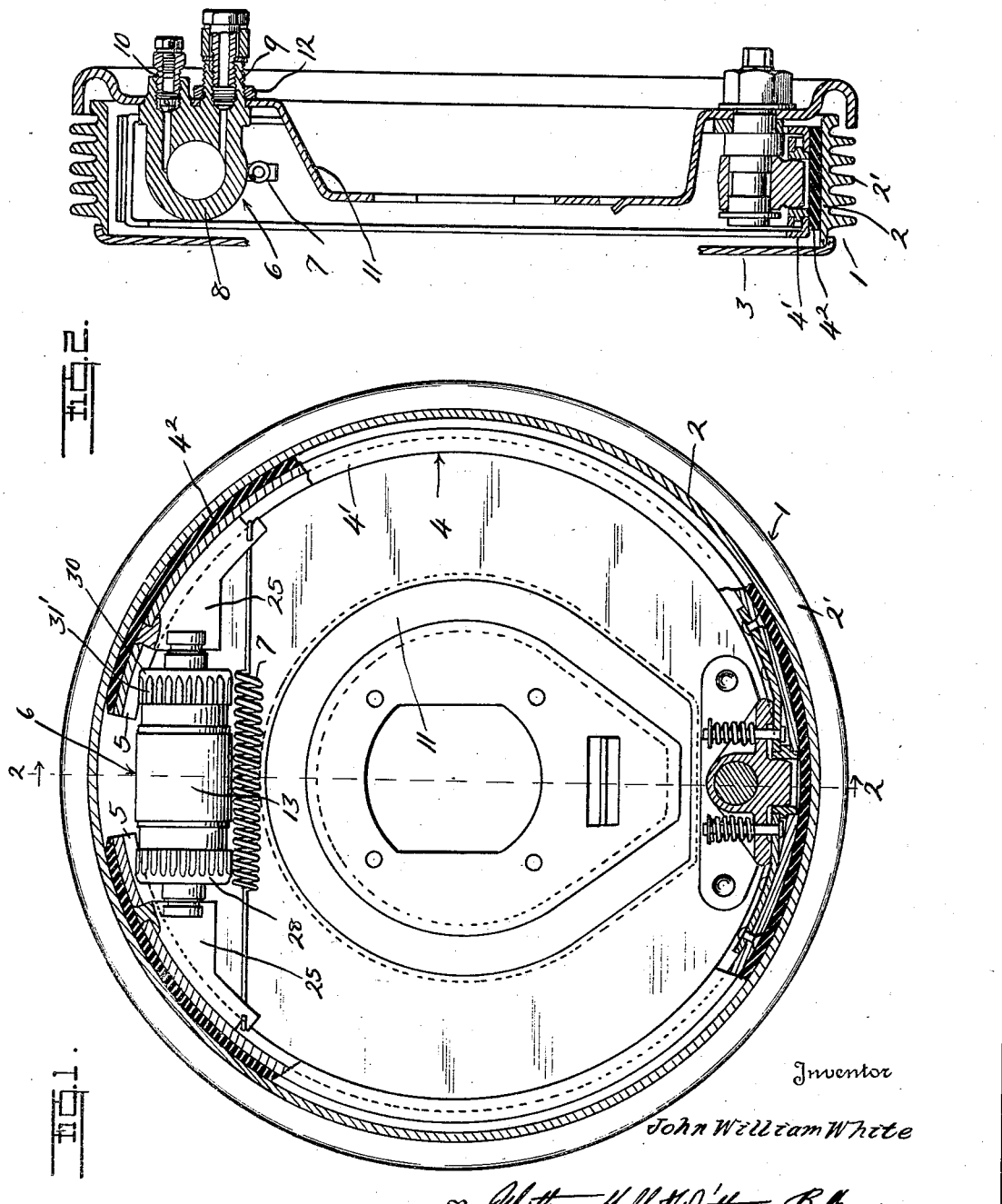

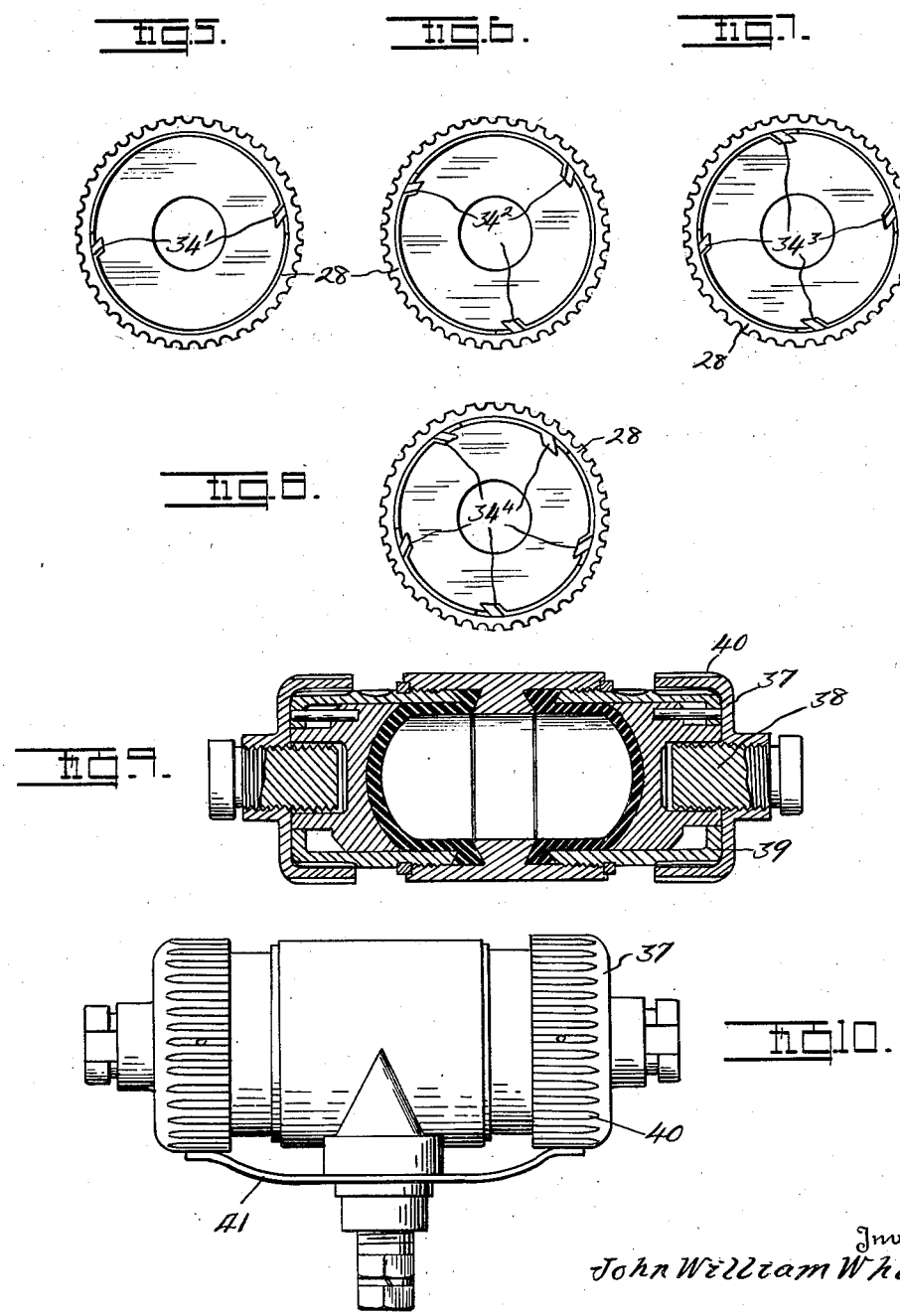

Patented July 20, 1937

2,087,392

UNITED STATES PATENT OFFICE 2,087,392

BRAKE MECHANISM

John William White, Detroit, Mich., assignor, by mesne assignments, to Bendix Products Corporation, a corporation of Indiana Application March 27, 1933, Serial No. 663,083

20 Claims. (Cl. 188—152)

The invention relates to brake mechanisms and refers more particularly to vehicle brake mechanisms of that type in which the brake friction means is within and movable outwardly into frictional contact with the brake flange of the brake drum.

One of the objects of the invention is to provide an improved construction of actuator for the brake friction means. Other objects are to provide interchangeable automatic and hand adjustment mechanisms, either of which may be used to provide a limited clearance between the brake friction means and the brake flange of the brake drum; to so construct these adjustment mechanisms that either may be readily substituted for the other in the actuator; and to so construct the actuator that the clearance to be automatically maintained may be changed by substituting an individual element of the automatic adjustment mechanism. A further object is to provide an improved brake mechanism in which the increase in clearance between the brake friction means and the brake flange of the brake drum upon the generation of heat resulting from the application of the friction means to the brake flange is kept down, so that the clearance may be reduced to the least possible.

These and other objects of the invention will become apparent from the following description, taken in connection with the accompanying drawings, in which Figure 1 is a sectional elevation of a brake mechanism showing an embodiment of my invention;

Figure 2 is a cross section on the line 2—2 of Figure 1;

Figure 3 is an end view of the actuator;

Figure 4 is an elevation, partly broken away and partly in section, on the line 4—4 of Figure 3;

Fig. 4A is an enlarged sectional elevation of a portion of Fig. 4; Fig. 4B is a cross section on line 4B—4B of Fig. 4A;

Figures 5, 6, 7 and 8 are elevations of modified constructions of nuts;

Figure 9 is a view similar to Figure 4 showing a modification;

Figure 10 is a plan view thereof.

Referring to Figures 1 to 4 inclusive, 1 is the brake drum of the brake mechanism adapted to be secured to a wheel of a motor vehicle and having the brake flange 2 and the back 3. 4 is the brake friction means within the brake drum and comprising the body 4' and the lining 4² adapted to be forced into frictional contact with the brake flange, this friction means having the separable ends 5 diametrically opposite the pivotal mounting for the friction means. 6 is the actuator for the friction means adapted to spread the ends 5 apart and 7 is the means in the nature of a coil spring connected to the ends for retracting the same and holding the friction means out of contact with the brake flange.

The actuator comprises the support 8 having the fluid conducting nipple 9 and the bleeder nipple 10 extending through the backing plate 11 for the brake drum, the support being fixedly mounted upon the backing plate by suitable means, such as the nut 12 threaded upon the nipple 9. The support also has the cylindrical portions 13 and intermediate these portions the cylindrical inwardly extending portion 14, the opposite ends of which are tapered to form the internal annular tapered shoulders 15. 16 are flexible diaphragms preferably formed of rubber and clamped against the shoulders 15 and forming with the cylindrical portion 14 a flexible sack. Each diaphragm has at its free end the wedge-shaped bead 17 providing opposed shoulders, one of which is adapted to be clamped against the adjacent tapered shoulder 15 and the other of which is adapted to be engaged by the tapered shoulder formed by the inner end of the cylindrical retainer 18. This retainer in turn telescopes within and threadedly engages the adjacent cylindrical portion 13. To limit the clamping movement of each retainer, I have formed in the outer end of each cylindrical portion 13 the annular recess 19 and I have also provided the transversely split resilient ring 20, which is adapted to engage in the annular groove 21 of the retainer and the annular recess 19 and to contact with the internal shoulder forming a side of this recess. 22 is the reciprocable member or plunger within each retainer 18 and adapted to contact with the adjacent diaphragm 16, this reciprocable member having the reduced cylindrical outer end 23 slidably engaging the edge of the transverse or inturned annular flange 24 formed at the outer end of the retainer.

With the above construction, it will be seen that I have provided a simple construction of cylinder housing comprising the support 8 and the retainer 18 in which the diaphragms 16 are clamped in place under a pressure sufficient to prevent leakage, but limited to avoid cutting or injuring the diaphragms.

The ends of the friction means are provided with the brackets 25 between which the actuator is located and the ends of the friction means are adapted to be spread apart by the screws 26, each of which freely extends into the axial recess 27 in the outer end of the reciprocable member 22. Each screw at its outer end is slotted to embrace the adjacent bracket 25 and is held from rotation thereby. Each screw is adapted to be forced outwardly upon outward movement of its reciprocable member by the nut 28, which is threaded upon the screw and which abuts the outer end of the reduced portion of the reciprocable member. Each nut in the normal position of the parts when the ends of the brake friction means are retracted abuts the transverse or inturned flange 24 of the adjacent retainer, thereby limiting inward movement of its screw and retracting movement of the adjacent end of the brake friction means. To hold each reciprocable member 22 from rotation, I have provided the dowel pin 29 which extends parallel to the axis of the reciprocable member and preferably has one end fixed therein and the other end slidably engaging in an aperture in the transverse or inturned flange 24.

For the purpose of adjusting the brake mechanism to compensate for wear particularly of the brake lining and to maintain limited clearance between the brake friction means and the brake flange of the brake drum, the nut 28 is automatically rotated to advance its screw a limited distance upon movement of the reciprocable member or plunger associated therewith slightly in excess of a predetermined amount. In detail, the nut 28 is cup-shaped and has the reduced internally threaded portion or flange 30 which is threaded upon the screw and the enlarged annular portion or flange 31 which extends over and encircles the outer end of the associated retainer 18. The periphery of the enlarged flange is roughened and preferably provided with the axial corrugations 31' to facilitate turning the nut by hand to adjust the screw relative to its reciprocable member or plunger. The periphery of the outer end of the retainer is formed with the ratchet teeth 32, each of which preferably has a radially extending face and a back inclined at an angle of approximately 60°. These teeth have a spiral lead or are inclined to the axis of the retainer at an angle of approximately 30°. The nut is provided with one or more resilient pawls 34 within its enlarged flange 31 and engageable with the ratchet teeth. As shown, the one or more pawls are preferably formed integral with the metallic ring 35 and stamped therefrom and the ring is pressed into and fixedly secured to the inner face of the enlarged flange by suitable means, such as the rivets 36. The number of the ratchet teeth is odd, there being 81 in the present instance, and, furthermore, they have a relatively small circular pitch of approximately one-sixteenth inch. As a result, the arrangement is such that with one pawl the axial travel of the nut required before the pawl would drop into the next tooth would be relatively small, it being .125 of an inch. By increasing the number of pawls the required axial travel is decreased for each increase in number, it being assumed that the pawls are equally spaced in each instant.

The construction is such that the nut is guided by its associated retainer and also serves to enclose and protect the associated ratchet teeth and pawl or pawls from dirt and the like, thereby eliminating the necessity of another member for this purpose.

Referring to Figures 5, 6, 7 and 8, Figure 5 shows two equally spaced pawls $34'$, Figure 6 shows three equally spaced pawls $34^2$, Figure 7 shows four equally spaced pawls $34^3$, and Figure 8 shows five equally spaced pawls $34^4$. In each instance, these pawls are formed and mounted in the same manner as shown particularly in Figure 4 and the nuts in which these pawls are mounted are formed in the same manner as each nut 28, so that they are interchangeable therewith and may be readily substituted therefor, so that change in clearance between the brake friction means and the brake flange of the brake drum may be readily made to suit requirements without changing the remainder of the actuator construction.

With the parts as thus far described, it will be seen that during the outward movement of the reciprocable member or plunger 22 actuated by the hydraulic pressure upon its associated diaphragm 21, the associated nut 28 and screw 26 are moved outwardly, the nut being guided by its retainer, and, if the outward movement is sufficient, a pawl upon the nut becomes engaged with the next succeeding ratchet teeth, the reciprocable member or plunger being held from rotation by the dowel pin 29 and the nut being held from rotation because of the brake load. However, during the return movement and while the brake friction means is being retracted, the nut no longer is subjected to the brake load and will, therefore, be turned by the sliding of the pawl along the radially extending face of the ratchet tooth engaged thereby, so that the screw is advanced.

As shown in Figures 9 and 10, hand adjustment mechanism is provided and the construction is such that but one element at each end of the actuator is new in the construction. This element is the nut 37 which is constructed in the same manner as the nut 28 to thread upon the screw 38 and to extend over and be guided by the associated retainer 39. The periphery of the enlarged annular portion or flange of this nut is provided with the axially extending corrugations 40, but the inner face of this enlarged flange is plain and not provided with any pawl or pawls. The screw 38 may be readily adjusted by rotating the nut, the backing plate for the brake drum being provided with an aperture for this purpose. The construction is also such that this nut may be readily substituted for the nut 28. For the purpose of yieldably holding each nut 37 from rotation, I have provided spring means 41 engageable with the corrugations of the nuts and secured to the cylinder housing. As shown, this spring means is in the nature of a flat spring having its end portions engaging the corrugations of the nuts and having its intermediate portions sleeved upon the nipples of the actuator support and adapted to be clamped against the backing plate.

In the operation of a brake mechanism having automatic adjustment mechanism, it is vital that the increase in clearance between the brake friction means and the brake flange of the brake drum upon the generation of heat caused by the application of the brake friction means to the brake flange be kept down, so that the clearance between the brake friction means and the brake flange may be reduced to the least possible. It is known that in conventional brake mechanisms the heat generated by the application of the brake friction means to the brake flange causes the brake flange to expand faster than the brake friction means, because the latter is shorter than the former and the generated heat flows freely into the former, but is impeded from flowing into the body of the brake friction means by the low heat conductivity of the lining upon the body. With automatic adjustment mechanism, any increase of clearance when the parts are hot causes further adjustment of the brake mechanism until the clearance, when the parts are hot, is the same as when the parts are cold and, as a result, the clearance, when the parts are hot, must be arranged to be not less than the minimum clearance when the parts are cold plus the expansion difference between brake friction means and the brake flange. With my construction, the increase in clearance when the parts are hot may be kept down by making the brake friction means 4 a full band shoe, as shown in Figure 2, so that the length thereof and of its body 4' particularly is nearly equal to that of the brake flange. I also make the brake flange 2 with the heat dissipating ribs 2', as shown in Figure 1, to reduce the expansion of the brake flange and the number and arrangement of these ribs may be varied, so that when using the full band shoe the clearance may be maintained constant or even diminished. In addition, the body 4' of the brake friction means may be formed of metal having a higher coefficient of expansion than that of the brake flange, an example being aluminum, which lengthens about twice as fast as the steel or iron of the brake flange, so that by varying the length of the brake friction means the clearance may be maintained constant or even diminished.

As above stated, the flow of heat into the brake friction means is retarded by means of the low heat conductivity of the lining, while the brake flange offers a quick path for flow of heat therethrough. While the brake friction means is blanketed by the brake drum and the backing plate so that it may cool off at a slower rate than the brake flange, it also does not expand upon the first few applications of the brake friction means to the brake flange as fast as the brake flange. Neither do the heat dissipating ribs effectively cool the brake flange until the temperature becomes appreciable. It is therefore evident that the clearance increases in the first few (possibly four) applications of the brake and then, with the above construction, does not increase.

It is for this reason that my automatic adjustment mechanism is constructed to take up the clearance with very small or minute increments, so that during these first few applications the normal clearance will not be sensibly reduced. By making the pitch of the threads in each screw very small, it being approximately .050 of an inch in the present instance, the take up in clearance using one pawl only is very small, it being in the present instance approximately 3/10 of a thousandth of an inch. By increasing the number of pawls the take up in clearance is decreased. In any event, the take up is so infinitely small that with severe applications of the brake friction means to the brake flange the wear of the lining is as much as the take up. In fact, with the average lining and using an automatic adjustment mechanism with four pawls, this has proven to be the case. As a result, the take up until the brake friction means is up to temperature is negligible and therefore the automatic adjustment in my construction practically functions only with wear of the lining and is practically independent of expansion and contraction due to heat.

What I claim as my invention is:

1. The combination with a brake drum and brake friction means therefor, of an actuator for said friction means having a cylindrical member, a member reciprocable within said cylindrical member, a second member between said friction means and reciprocable member, and a third member telescopically encircling said cylindrical member and operatively connected to said second member to adjust the latter relative to said reciprocable member.

2. The combination with a brake drum and brake friction means therefor, of an actuator for said friction means having a cylindrical member, a member reciprocable within said cylindrical member, a screw between said friction means and reciprocable member, and a nut telescopically encircling said cylindrical member and threadedly engaging said screw to adjust the latter relative to said reciprocable member.

3. The combination with a brake drum and brake friction means therefor, of an actuator for said friction means having a cylindrical member, a member reciprocable within said cylindrical member, a screw between said friction means and reciprocable member, a cup-shaped nut having a peripherally roughened portion encircling said cylindrical member and a portion threadedly engaging said screw to adjust the latter relative to said reciprocable member, and means engaging the roughened periphery of said encircling portion for yieldably holding said nut from rotation.

4. The combination with a brake drum and brake friction means therefor, of an actuator for said friction means having a cylindrical member, a member reciprocable within said cylindrical member, a screw between said friction means and reciprocable member and a nut having a portion encircling said cylindrical member and provided with a corrugated periphery and also having a portion threadedly engaging said screw to adjust the latter relative to said reciprocable member, and spring means engaging said corrugated periphery for normally holding said nut from rotation.

5. The combination with a brake drum and brake friction means therefor, of an actuator for said friction means having a cylindrical support formed with an internal shoulder, a flexible diaphragm within said support and having opposed shoulders, a retainer engaging one of said opposed shoulders and clamping the other of said opposed shoulders against said internal shoulder, said retainer having an external groove therein, and a snap ring in said groove and engageable with said support for limiting the clamping movement of said retainer.

6. The combination with a brake drum and brake friction means therefor, of an actuator for said friction means having a cylindrical support formed with an internal shoulder, and also formed with an annular recess in an end thereof, a flexible diaphragm within said support and having opposed shoulders, a cylindrical retainer engaging one of said opposed shoulders and clamping the other of said opposed shoulders against said internal shoulder, and a transversely split ring upon said retainer and extending within said annular recess and engaging said support for limiting the clamping movement of said retainer.

7. The combination with a brake drum and brake friction means therefor, of an actuator for said friction means having a cylinder housing provided at one end with ratchet teeth inclined to its axis, a member reciprocable within said housing, a second member between said friction means and reciprocable member, means comprising a pawl engageable with said ratchet teeth to effect movement of said second member relative to said reciprocable member, and protecting means extending over said housing and inclosing said ratchet teeth.

8. The combination with a brake drum and brake friction means therefor, of an actuator for said friction means having a cylindrical member provided with ratchet teeth inclined to its axis, a member reciprocable within said cylindrical member, a second member between said friction means and reciprocable member, a third member operatively connected to said second member to adjust the latter relative to said reciprocable member, and a pawl carried by said third member and engageable with said ratchet teeth to effect adjusting movement of said third member upon movement of said reciprocable member slightly in excess of a predetermined limit.

9. The combination with a brake drum and brake friction means therefor, of an actuator for said friction means having a cylindrical member provided with ratchet teeth upon its periphery inclined to its axis, a member reciprocable within said cylindrical member, a second member between said friction means and reciprocable member, and a cup-shaped third member having a portion operatively connected to said second member to adjust the latter relative to said reciprocable member upon rotation of said third member, said third member also having a portion encircling said cylindrical member, and a pawl upon said last mentioned portion and engageable with said ratchet teeth to effect rotation of said third member upon movement of said reciprocable member slightly in excess of a predetermined limit.

10. The combination with a brake drum and brake friction means therewithin, of an actuator for said friction means having a cylindrical member provided upon its periphery with ratchet teeth inclined to its axis, a member reciprocable within said cylindrical member, a screw between said friction means and reciprocable member, a cup-shaped nut having a portion threadedly engaging said screw and a portion encircling said cylindrical member, and a pawl within said last mentioned portion and carried by said nut and engageable with said ratchet teeth to effect rotation of said nut upon movement of said reciprocable member slightly in excess of a predetermined limit.

11. The combination with a brake drum and brake friction means therewithin, of an actuator for said friction means having a cylindrical member provided upon its periphery with ratchet teeth inclined to its axis, a member reciprocable within said cylindrical member, a screw between said friction means and reciprocable member and held from rotation by said friction means, a cup-shaped nut threadedly engaging said screw and abutting said reciprocable member and adapted to move said screw longitudinally outward upon longitudinally outward movement of said reciprocable member, said nut having a portion encircling said ratchet teeth and a pawl within said portion and carried by said nut and engageable with said ratchet teeth to effect rotation of said nut after said reciprocable member has moved slightly in excess of a predetermined limit.

12. The combination with a brake drum and brake friction means therefor, of an actuator for said friction means having a cylindrical member, a member reciprocable within said cylindrical member, cooperating means upon said cylindrical member and reciprocable member for holding the latter from rotation relative to the former, a second member between said friction means and reciprocable member, a rotatable third member operatively connected to said second member to adjust the latter relative to said reciprocable member upon rotation of said third member, said third member abutting said reciprocable member and being adapted to move said second member longitudinally outward upon longitudinally outward movement of said reciprocable member, and means automatically operating after a longitudinally outward movement of said reciprocable member slightly in excess of a predetermined limit to effect rotation of said third member.

13. The combination with a brake drum and brake friction means therefor, of an actuator for said friction means having a cylindrical member, a member reciprocable in said cylinder, a dowel pin between said cylindrical member and reciprocable member and slidably engaging one and fixed to the other for holding said reciprocable member from rotation relative to said cylindrical member, a second member between said friction means and reciprocable member, a rotatable third member operatively connected to said second member to adjust the latter relative to said reciprocable member upon rotation of said third member, said third member abutting said reciprocable member and being adapted to move said second member longitudinally outward upon longitudinally outward movement of said reciprocable member, and means automatically operating after a longitudinally outward movement of said reciprocable member slightly in excess of a predetermined limit to effect rotation of said third member.

14. The combination with a brake drum and brake friction means therefor, of an actuator for said friction means having a cylindrical member, a member reciprocable within said cylindrical member, cooperating means upon said cylindrical member and reciprocable member for holding the latter from rotation relative to the former, a second member between said friction means and reciprocable member, and means for moving said second member in one direction upon movement of said reciprocable member in one direction.

15. The combination with a brake drum and brake friction means therefor, of an actuator for said friction means having a cylindrical member with an inturned end, a member reciprocable within said cylindrical member, a dowel pin between said cylindrical member and reciprocable member, said dowel pin being secured to said reciprocable member and slidably engaging said inturned end, a screw between said friction means and reciprocable member, and a nut threadedly engaging said screw and abutting said reciprocable member and adapted to move said screw in one direction upon movement of said reciprocable member in one direction.

16. The combination with a brake drum and brake friction means therefor, of an actuator for said friction means having a cylindrical member, a member reciprocable within said cylindrical member, a screw between said friction means and reciprocable member, a cup-shaped nut having a peripherally roughened portion encircling said cylindrical member, and a portion threadedly engaging said screw and cooperating automatic adjusting means upon said cylindrical member and nut.

17. The combination with a brake drum and brake friction means therefor, of an actuator for said friction means having a cylinder housing provided with ratchet teeth inclined to its axis, a member reciprocable within said housing, a screw between said friction means and reciprocable member and an exchangeable automatic adjustment nut having a selected number of pawls engageable with said ratchet teeth and threadedly engaging said screw.

18. The combination with a brake drum and brake friction means therefor, of an actuator for said friction means having a cylindrical member provided with ratchet teeth inclined to its axis, a member reciprocable within said cylindrical member, a screw between said friction means and reciprocable member and an exchangeable automatic adjustment nut having a selected number of pawls engageable with said ratchet teeth and encircling said cylindrical member and threadedly engaging said screw.

19. The combination with a brake drum and brake friction means therewithin, said friction means being formed of material having a higher rate of expansion than that of said drum to keep down the clearance between said members when subjected to heat generated by the application of said friction means to said drum, of an actuator for said friction means having automatic adjustment mechanism for maintaining the clearance.

20. The combination with a brake drum and brake friction means therefor, of an actuator for said friction means having a housing member a reciprocable member, a screw between said friction means and reciprocable member, and a nut threadedly engaging said screw to adjust the latter relative to said reciprocable member, said nut being guided by said housing member during its movement with said reciprocable member.

JOHN WILLIAM WHITE.